Figure 1:
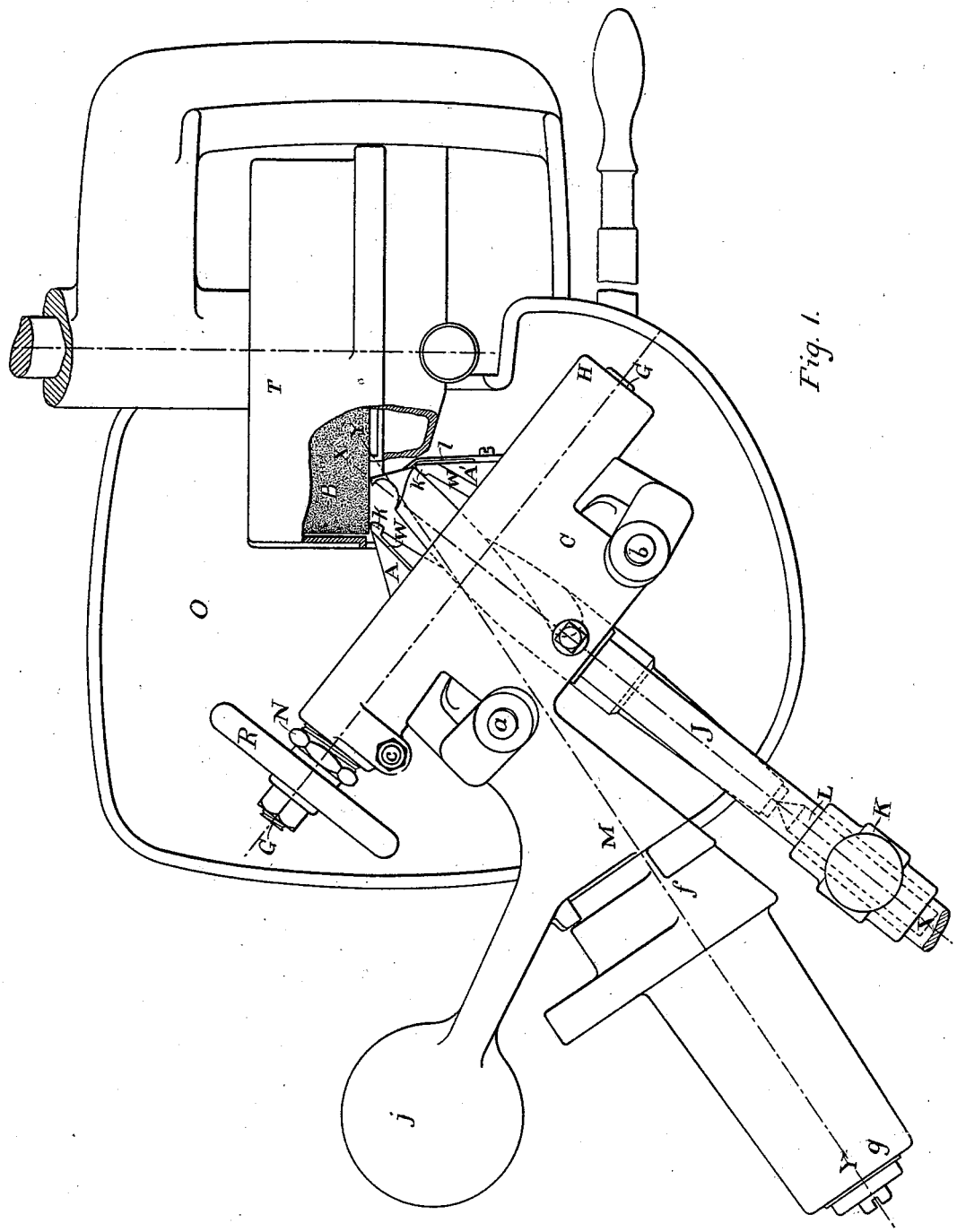

(No Model.) 2 Sheets—Sheet 1.

J. S. BANCROFT.
CHUCK FOR DRILL GRINDING MACHINES.

No. 520,749. Patented May 29, 1894.

WITNESSES:
F. E. Ounsworth
E. N. Harper

INVENTOR
J. Sellers Bancroft

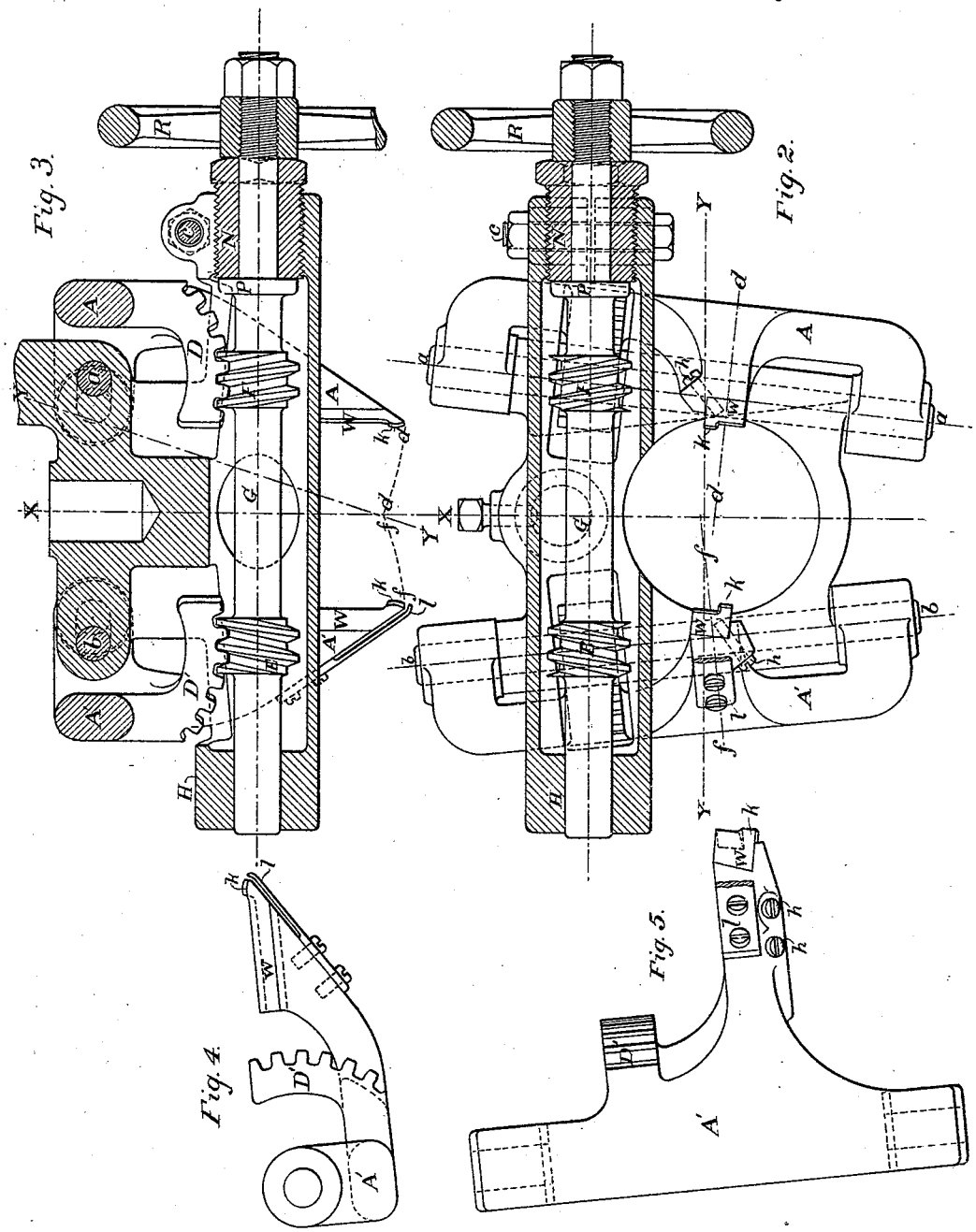

United States Patent Office.

JOHN SELLERS BANCROFT, OF PHILADELPHIA, PENNSYLVANIA, ASSIGNOR TO THE WILLIAM SELLERS & COMPANY, INCORPORATED, OF SAME PLACE.

CHUCK FOR DRILL-GRINDING MACHINES.

SPECIFICATION forming part of Letters Patent No. 520,749, dated May 29, 1894.

Application filed July 21, 1893. Serial No. 481,122. (No model.)

*To all whom it may concern:*

Be it known that I, JOHN SELLERS BANCROFT, of the city and county of Philadelphia and State of Pennsylvania, have invented certain new and useful Improvements in Chucks for Drill-Grinding Machines, of which the following is a specification.

My present improvement relates to the chuck for holding the drill to be ground in proper position, relatively to its axis and to the axis of rotation of the chuck, which determines the contour of the drill lip.

The objects of my present invention, are to simplify the construction of the chuck; to insure its accuracy and durability; to increase its range and diminish the cost of maintenance, and to these ends my invention consists, in providing two gripping jaws pivoted on separate axes, with gear segments and in operating these jaws by a screw.

It further consists in so locating the axes of these jaws relatively to the axes of the chuck and to each other, that the position of any drill held in the chuck with relation to the axis about which its end lip is to be ground, will vary with the diameter of the drill.

It further consists in providing the gripping ends of these jaws, with removable dies of harder material than the jaws, secured so that their position relating to the axes of the chuck is accurately determined, and in providing each of these dies with a clamping surface and a stop, which stops determine the rotative position of the drill.

In the accompanying drawings, which form part of this specification, Figure 1, Sheet 1, represents a plan of the chuck and the grinding wheel, with the wheel cover partly in section. Fig. 2, Sheet 2, is an end elevation of the chuck, taken at right angles to the axis of the drill, showing a section of the case on the center line of the clamping screw. Fig. 3, is a sectional plan of Fig. 2, on a plane passing through the center of the clamping screw. Fig. 4, is a plan of the clamping jaw with end stop. Fig. 5, is a front view of Fig. 4.

The drill chuck is shown as applied to the form of drill grinding machine, shown and described in United States Patent No. 270,365, dated January 9, 1883.

In Fig. 1, B is the grinding wheel, O the stand carrying the chuck, M the shaft of the drill chuck supported in bearings $f$ and $g$ so as to turn freely about the chuck axis Y—Y; X—X, is the axis of the drill, L the back center carrying the end of the drill; K, is a cross head carrying the back center L and sliding on the rod J projecting from the back of the chuck; C is the chuck body secured to or formed with the shaft M, and provided with the counterweight $j$. Two pins $a$—$a$, $b$—$b$, secured in this body C, and at an angle with each other as shown in Fig. 2, form bearings or pivots for the clamping jaws A, A'. These jaws are each provided with gear segments D and D', into which mesh the threads E and F, formed on the clamping screw G. This screw is supported at one end in a bearing H formed in the chuck body, and at the other end in a bushing N, which by means of the collar P and the hub of the operating hand wheel R, secure the screw G against end motion; the bushing N is provided with a screw thread on its exterior, by means of which it can be adjusted longitudinally so as to bring the jaws A, A', into proper relation in plan to the axis Y—Y; the bushing is clamped to place, when adjusted, by the bolt $c$. When the screw G is revolved, the ends of the jaws A, A' move in the paths indicated by the broken lines $d$, $d$, and $f$, $f$. The clamping ends of these jaws are provided with steel dies W, W, which are secured to the jaws A, A', by the screws $h$, $h$, placed diagonally as shown in Fig. 2, whereby the die W is firmly secured in the corner planed in the end of the jaw to receive it; the outer ends of the dies are made slightly rounding, as shown in Figs. 1, 3 and 4, so that any size of drill held in the chuck will be tangent to this curved surface; each die is also provided with a stop $k$ which limits the rotation of the drill to be ground, and thus brings the cutting edge in proper relation to the two axes Y—Y, X—X, Fig. 1. These dies are made exactly alike in every respect and may be secured to either jaw as described, thus being interchangeable. The jaw A' is also provided with an end stop $l$, preferably made so that it will yield under a certain pressure, secured to the jaw A' as shown in Fig. 4. It will be observed that the lines $d, d$, and $f, f$, representing the paths of the clamping ends of the jaws and dies, are inclined as shown in Fig. 2, so that as the jaws A, A', are closed to grasp a small drill, the center of the drill is raised so as to bring it nearer to the axis Y—Y about which the chuck is swung, thus automatically compensating for the decreasing thickness of the points of smaller drills, and in the plan view, Fig. 3, it will be observed that these paths form arcs of circles which draw back the smaller drills closer to the body of the chuck, and hence closer in this direction to the axis Y—Y, as shown by the intersection of the two axes X—X and Y—Y in Figs. 1 and 3, thus reducing the radius of curvature of the end surface ground on the lip of the drill and relieving the operator of all adjustments in varying from one sized drill to another, for the mere clamping of the drill in the chuck, automatically places it in the proper position for producing the best form of clearance for that particular size of drill.

The operation of the chuck is as follows:—
The drill to be ground is inserted in the chuck, and the jaws gently closed on it by operating the hand wheel R, the end of the drill being held lightly against the elastic end stop $l$; the back center L is now brought up against the drill and the crosshead K firmly clamped to place on the rod J; the jaws are now opened slightly and the drill held against the center L, while it is rotated, so that the lips rest against the stops $k, k$, which thus limit the rotation of the drill, and fix the position of the cutting edge to be sharpened relatively to the axis Y—Y of the chuck; the hand wheel R is now operated to close the jaws and clamp the drill firmly for grinding one lip; when this has been ground by the grinding wheel B, the drill being swung or vibrated by the chuck about the axis Y—Y, the jaws are released and the drill turned half-way round, so as to present the opposite lip to the wheel, care being taken in each case, to hold the drill firmly against the back center L when seizing it by the jaws.

Having now described my invention, what I claim as new, and desire to secure by Letters Patent, is—

1. A drill holding chuck body, and two opposed gripping jaws pivoted upon axes which are inclined to each other, in combination with mechanism for opening and closing these jaws.

2. A drill holding chuck body, two opposed gripping jaws pivoted upon axes which are inclined to each other, mechanism for operating these jaws, and gripping dies, secured to the jaws.

3. A drill holding chuck body, two opposed gripping jaws, mechanism for operating these jaws, and gripping dies provided with side stops that limit the rotation of the drill, in combination with a yielding end stop.

J. SELLERS BANCROFT.

Witnesses:
F. E. OUNSWORTH,
E. R. HARPER.